(12) United States Patent
Lim

(10) Patent No.: US 10,340,701 B2
(45) Date of Patent: Jul. 2, 2019

(54) HYBRID POWER STORAGE APPARATUS

(71) Applicant: LSIS CO., LTD., Gyeonggi-do (KR)

(72) Inventor: Ju-Ho Lim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 283 days.

(21) Appl. No.: 15/360,160

(22) Filed: Nov. 23, 2016

(65) Prior Publication Data

US 2017/0288405 A1    Oct. 5, 2017

(30) Foreign Application Priority Data

Mar. 29, 2016    (KR) ........................ 10-2016-0037676

(51) Int. Cl.
| | |
|---|---|
| *H02J 1/10* | (2006.01) |
| *H02J 3/38* | (2006.01) |
| *H02J 7/34* | (2006.01) |
| *H02J 7/00* | (2006.01) |
| *H02J 13/00* | (2006.01) |
| *H02M 7/44* | (2006.01) |
| *H02J 7/35* | (2006.01) |

(52) U.S. Cl.
CPC .............. *H02J 3/383* (2013.01); *H02J 3/386* (2013.01); *H02J 3/387* (2013.01); *H02J 7/0068* (2013.01); *H02J 7/35* (2013.01); *H02J 13/00* (2013.01); *H02M 7/44* (2013.01); *Y02E 10/563* (2013.01); *Y02E 10/566* (2013.01); *Y02P 90/50* (2015.11)

(58) Field of Classification Search
CPC .... H02J 3/383; H02J 7/35; H02J 3/386; H02J 13/00; H02J 7/0068; H02J 3/387; H02M 7/44; Y02P 90/50; Y02E 10/566; Y02E 10/563

USPC .......................................................... 307/52
See application file for complete search history.

(56) References Cited

FOREIGN PATENT DOCUMENTS

| | | |
|---|---|---|
| JP | 2009-542182 A | 11/2009 |
| JP | 2015-173517 A | 10/2015 |
| JP | 2015-177628 A | 10/2015 |
| JP | 2015-213409 A | 11/2015 |
| JP | 2016-39761 A | 3/2016 |
| JP | 2016-508018 A | 3/2016 |
| KR | 10-1477648 B1 | 12/2014 |
| KR | 10-2015-0037138 A | 4/2015 |
| KR | 10-2015-0115063 A | 10/2015 |

OTHER PUBLICATIONS

Office Action dated Jun. 6, 2017 issued in corresponding Japanese Application No. 2016-221898.

*Primary Examiner* — Richard Tan
(74) *Attorney, Agent, or Firm* — K&L Gates LLP

(57) ABSTRACT

A hybrid power storage apparatus according to one embodiment of the present disclosure includes a battery configured to store first electric power supplied to an electric power system and second electric power supplied therefrom; an electric power conversion unit configured to convert the first electric power into an alternating current (AC) power and the second electric power into a direct current (DC) power; and a control unit configured to receive electric power information of the electric power system from a server, and control the battery and the electric power conversion unit to supply electric power to the electric power system or to receive electric power supplied therefrom based on a magnitude or a frequency of electric power included in the received electric power information.

9 Claims, 6 Drawing Sheets

PRIOR ART

PRIOR ART

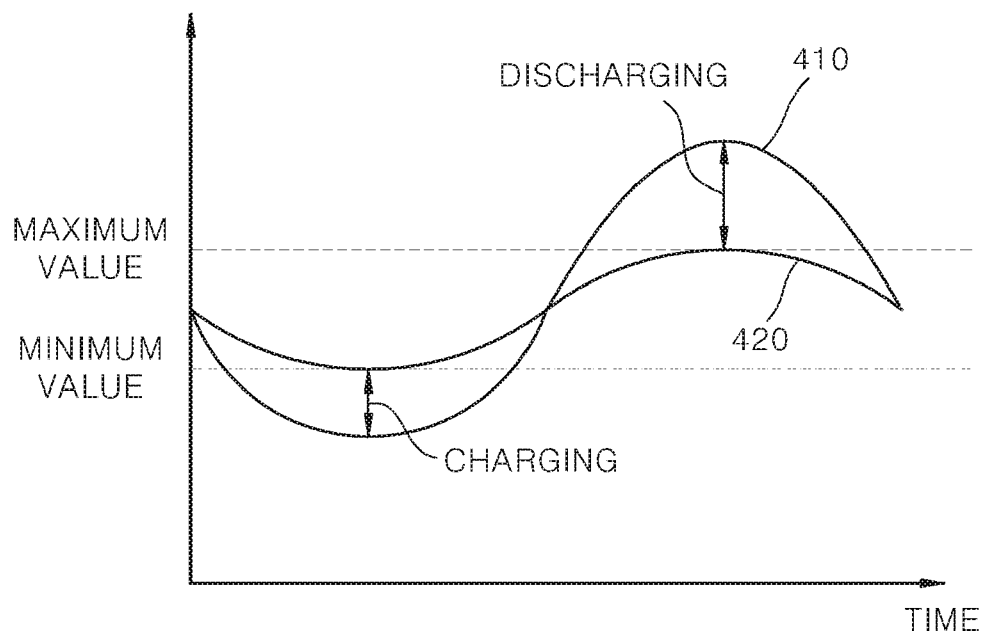

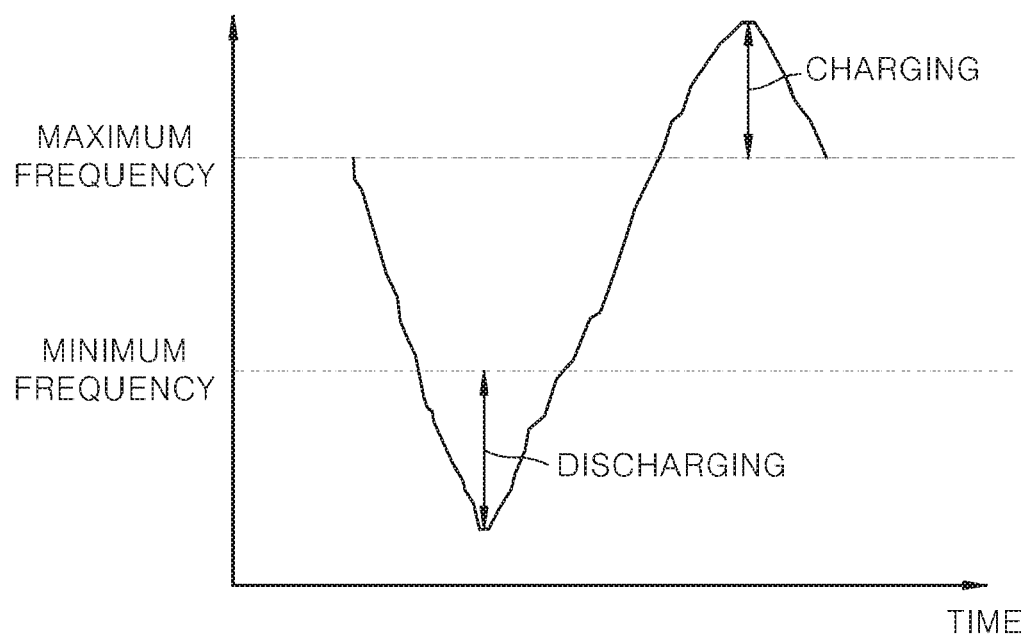

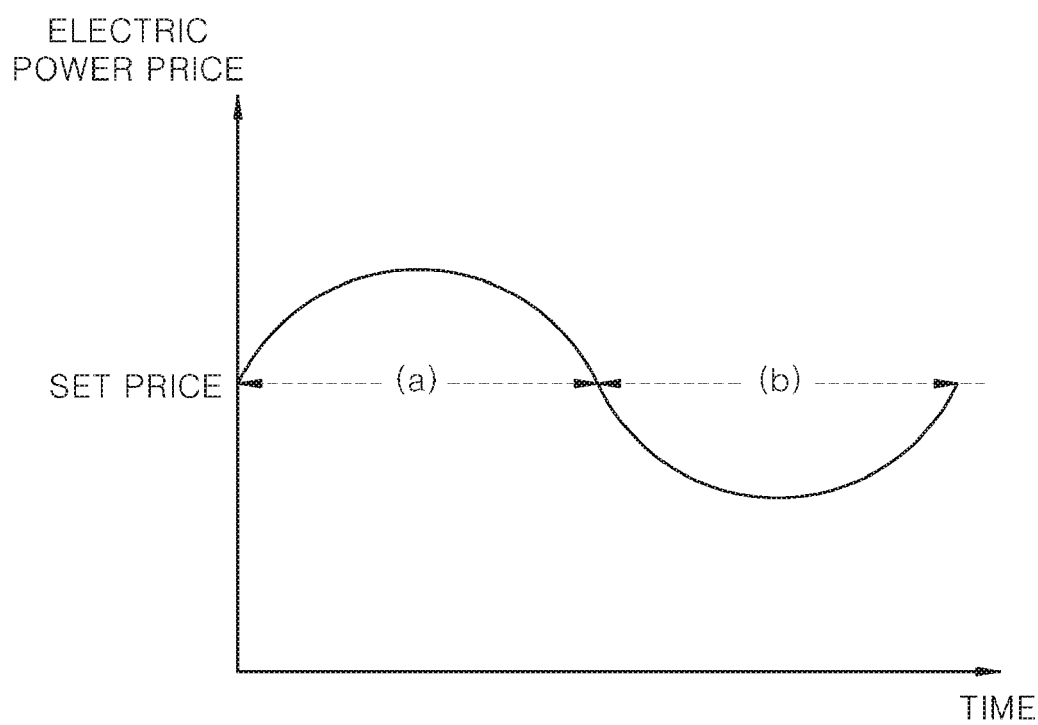

HYBRID POWER STORAGE APPARATUS

CROSS REFERENCE TO RELATED APPLICATION

This application claims the benefit of Korean Patent Application No. 10-2016-0037676, filed on Mar. 29, 2016, entitled "HYBRID POWER STORAGE APPARATUS", which is hereby incorporated by reference in its entirety into this application.

BACKGROUND

1. Technical Field

The present disclosure relates to a hybrid power storage apparatus, and more particularly, to a hybrid power storage apparatus capable of performing an optimized operation depending on an electric power system by supplying electric power to the electric power system or receiving electric power therefrom based on electric power information of the electric power system, which is received from a server.

2. Description of the Related Art

A power storage apparatus is a storage apparatus which temporarily stores electric power that is excessively generated at a power plant and transmits the stored electric power when electric power shortage occurs. The power storage apparatus includes a battery for storing electric power, and related devices for effectively managing the battery. Such a power storage apparatus enables an electric power producer to effectively supply electric power and an electric power consumer to economically consume electric power.

The restriction on usage of fossil fuel being a major energy source has been intensified as the usage of fossil fuel is associated with side effects including climate change and the like, and thus new renewable energy is recently getting the limelight as coal and petroleum are depleted. Therefore, there is increasing interest in a power storage apparatus capable of effectively generating and consuming electric power and stably supplying new renewable enemy.

A power storage apparatus is largely configured with a battery, a device for converting electric energy of the battery (hereinafter, referred to as an electric power conversion device), and a control device for controlling the battery and the electric power conversion device (hereinafter, referred to as a control device). The battery serves to store electric power and to supply the stored electric power as necessary via the electric power conversion device. Also, the electric power conversion device serves to convert a characteristic of electric power so as to receive the electric power from an electric power generation source to store the electric power in the battery or to transmit it to an electric power system. Lastly, the control device serves to integrally manage the battery and the electric power conversion device.

An operating method of the power storage apparatus is largely classified into an electric power magnitude adjustment method and a frequency adjustment method. The electric power magnitude adjustment method is devised to use a peak time of electric power usage and is capable of reducing electricity bill by storing electric power during a time slot of low electric power prices and supplying the stored electric power during a time slot at which a consumption amount of electric power is large.

Meanwhile, the frequency adjustment method is devised to maintain a frequency of an electric power generator at a predetermined reference and uses a property in which electric power is superior in quality when a frequency is uniform. A frequency of electric power is decreased when a consumption amount of electric power is greater than a supply amount thereof, and otherwise, it is increased when the consumption amount of electric power is less than the supply amount thereof. At this point, by charging the electric power when the frequency exceeds a reference frequency and discharging and supplying the charged electric power when the frequency is less than the reference frequency, efficiency of an electric power supply may be increased. To optimize such a power storage apparatus, a performance improvement of the power storage apparatus itself is important, and also it is more important to catch an electric power usage pattern of an electric power consumer and an electric power generation pattern of an electric power producer, thereby exactly analyzing the patterns.

FIG. 1 is a diagram illustrating a conventional power magnitude adjustment power storage apparatus 10, and FIG. 2 is a diagram illustrating a conventional power frequency adjustment power storage apparatus 20. Hereinafter, with reference to FIGS. 1 and 2, a problem of the conventional power storage apparatus will be described.

With reference to FIGS. 1 and 2, the conventional power storage apparatus operates the electric power magnitude adjustment apparatus 10 and the electric power frequency adjustment apparatus 20 as a separate apparatus. As a result, in an electric power magnitude adjustment method, there is a problem in that uncertainty of a measured value due to a measurement delay is not addressed. Further, in an electric power frequency adjustment method, there is a problem in that charging and discharging operations are grossly inefficient when variation of a frequency is severe. In addition, the conventional power storage apparatuses 10 and 20 do not use a real-time wireless communication so that there is a problem in that electric power information of an electric power system being updated by external factors is not reflected in real time.

SUMMARY

An object of the present disclosure is to provide a hybrid power storage apparatus capable of effectively being operated by selectively adopting an electric power magnitude adjustment method and an electric power frequency adjustment method.

Also, another object of the preset disclosure is to provide a hybrid power storage apparatus capable of performing an optimized operation depending on an electric power system by supplying electric power to the electric power system or receiving the electric power therefrom.

Further, still another object of the present disclosure is to provide a hybrid power storage apparatus capable of receiving electric power information of an electric power system through a server in real time and reflecting the electric power information being updated in real time, thereby performing an operation.

The objects of the present disclosure are not limited to the above described object, and other objects and advantages not mentioned above will be understood in the art from the following description and also will be apparently understood by an embodiment of the present disclosure. Also, it will be easily understood that the object and advantages of the present disclosure described herein may be implemented by means and a combination thereof defined by the appended claims.

To attain such objects, a hybrid power storage apparatus according to one embodiment of the present disclosure includes a battery configured to store first electric power supplied to an electric power system and second electric power supplied therefrom; an electric power conversion unit configured to convert the first electric power into an alternating current (AC) power and the second electric power into a direct current (DC) power; and a control unit configured to receive electric power information of the electric power system from a server, and control the battery and the electric power conversion unit to supply electric power to the electric power system or to receive electric power supplied therefrom based on a magnitude or a frequency of electric power included in the received electric power information.

In accordance with the present disclosure as described above, an electric power magnitude adjustment method and an electric power frequency adjustment method are selectively applied so that there is an effect in which an efficient operation may be possible.

Also, in accordance with the present disclosure, electric power is supplied to an electric power system or is supplied therefrom based on electric power information of the electric power system so that there is an effect in which an optimized operation depending on the electric power system may be performed.

Further, in accordance with the present disclosure, electric power information of the electric power system is received in real time through a server so that there is an effect in which the electric power information being updated is reflected to an operation in real time.

BRIEF DESCRIPTION OF DRAWINGS

FIG. 4 is a graph illustrating a magnitude of electric power over time.

FIG. 5 is a graph illustrating a frequency of electric power over time.

FIG. 6 is a graph illustrating electric power price over time.

DETAILED DESCRIPTION

Figure 1:
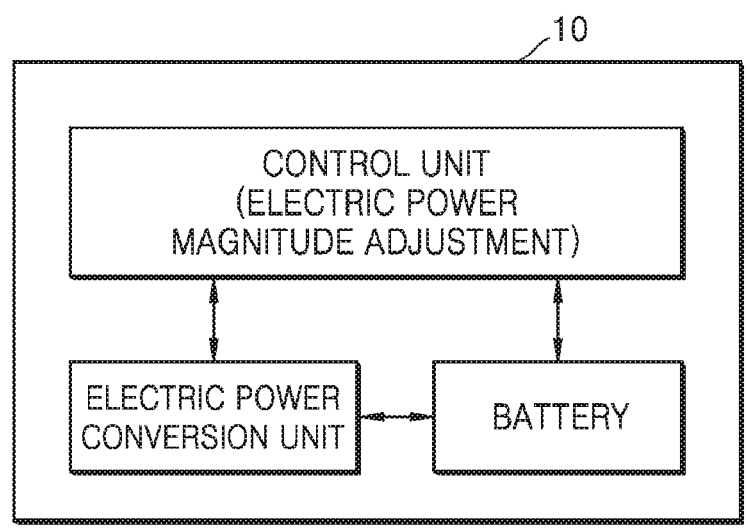
FIG. 1 is a diagram illustrating a conventional power magnitude adjustment power storage apparatus.
Figure 2:
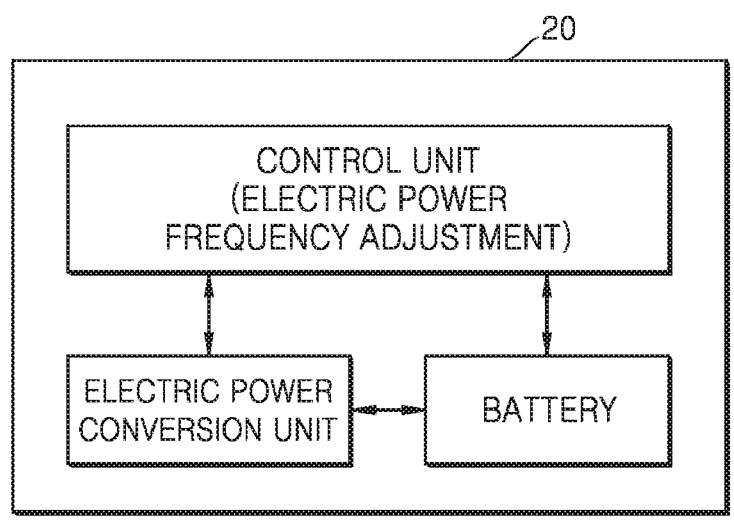
FIG. 2 is a diagram illustrating a conventional power frequency adjustment power storage apparatus.

The above and other objects, features and advantages of the present disclosure will be described later in detail with reference to the accompanying drawings, and thus the technical spirit of the present disclosure can be easily implemented by those skilled in the art. In the following description of the present disclosure, if a detailed description of known configurations and functions is determined to obscure the interpretation of embodiments of the present disclosure, the detailed description thereof will be omitted. Hereinafter, preferred embodiments according to the present disclosure will be described in detail with reference to the accompanying drawings. In the drawings, the same reference numerals refer to the same or similar elements throughout.

Figure 3:
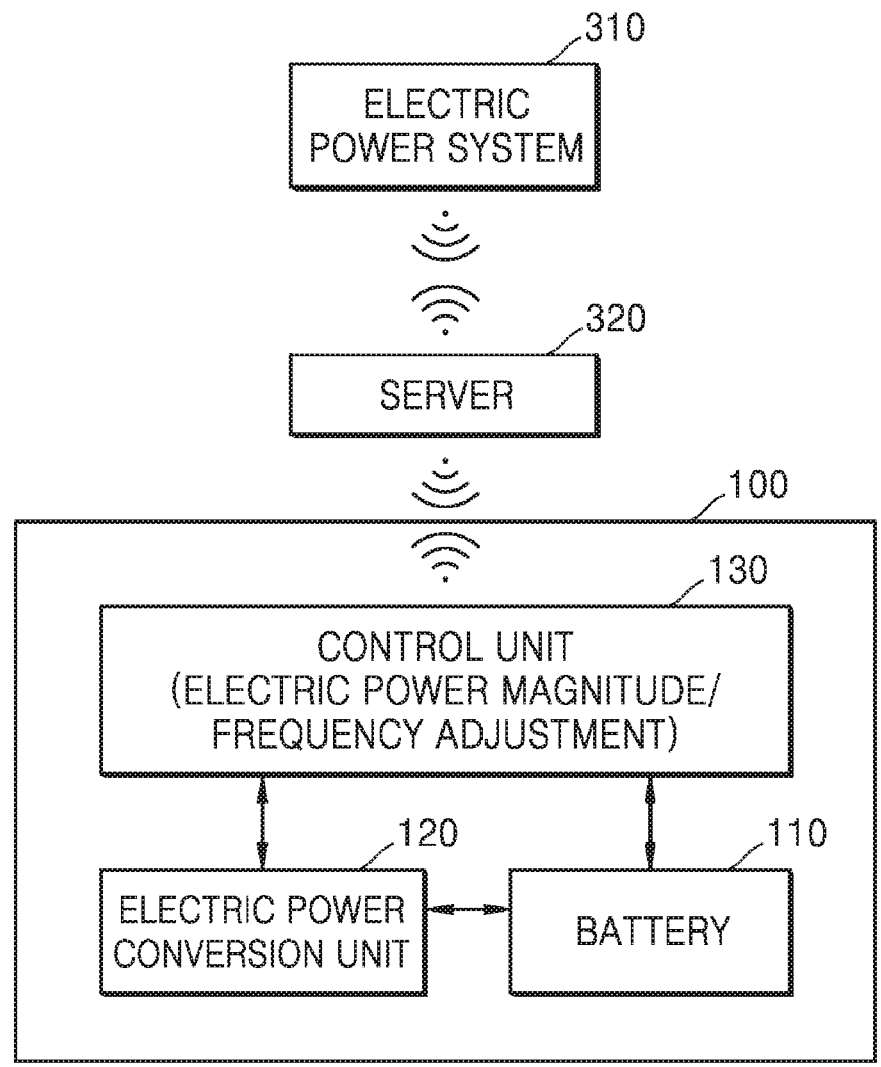
FIG. 3 is a diagram illustrating a receiving of electric power information from an electric power system and a server in a hybrid, power storage apparatus according to one embodiment of the present disclosure.

FIG. 3 shows a receiving of electric power information from an electric power system 310 and a server 320 in a hybrid power storage apparatus 100 according to one embodiment of the present disclosure. With reference to FIG. 3, the hybrid power storage apparatus 100 according to one embodiment of the present disclosure may be configured to include a battery 110, an electric power conversion unit 120, and a control unit 130. The hybrid power storage apparatus 100 shown in FIG. 3 is merely one embodiment, components thereof are not limited to one embodiment shown in FIG. 3, and some components thereof will be added, changed, and deleted as necessary. Hereinafter, the battery 110, the electric power conversion unit 120, and the control unit 130 will be described in detail with reference to FIG. 3.

The battery 110 may store first electric power supplied to an electric power system 310 and second electric power provided therefrom. Here, the electric power system 310 means a system in which a power plant, a substation, a power transmission and distribution cable, and a load are integrated to generate and use electric power. More particularly, the electric power system 310 may include power consumption facilities from home to a factory which use electric power. Also, the electric power system 310 may include power generation facilities such as a wind power plant, a solar power plant, a nuclear power plant and the like which generate electric power.

Also, the electric power system 310 may include an Internet server based on an internet of things (IoT), a cloud server, or the like, and thus it may include a transmission unit for transmitting electric power information to the server 320. For example, a power plant, a substation, and an industrial facility, which are included in the electric power system 310, may share a single server 320 based on an IoT with each other to transmit and receive information in real time through a wireless communication. Meanwhile, the electric power information may include all information of electric power generated and used in the electric power system 310, such as a consumption amount of electric power, a generation amount of electric power, electric power price, a magnitude of electric power, a frequency of electric power and the like.

Meanwhile, the server 320 is collectively called as all computers or programs which provide services to users, and may include Web, a database, a network and the like. More particularly, an Internet server, a cloud server, or the like, which are based on an IoT, may be included. As one embodiment, the server 320 may store electric power information of the electric power system 310, and receive the electric power information therefrom through a wireless communication based on an IoT. Also, the server 320 may be integrally configured with the Internet server or the cloud server of the electric power system 310.

The first electric power being stored in the battery 110 is electric power that had been stored in the battery 110, and may be electric power supplied to an industrial facility and the like, which consumes electric power, of the electric power system 310. Also, the second electric power may be electric power that is supplied from an electric power generator and the like for generating electric power of the electric power system 310 and then is stored.

The battery 110 may be connected to the electric power system 310 of an industrial facility, an electric power generator, and the like so as to transmit and receive electric power to and from the electric power system 310. Meanwhile, the battery 110 may be produced by a lithium-ion method and a lithium polymer method, and also may include a lead storage battery.

The electric power conversion unit 120 according to one embodiment of the present disclosure may convert the first electric power stored in the battery 110 into alternating current (AC) electric power, and the second electric power supplied from an electric power generator and the like into direct current (DC) electric power. More particularly, the electric power conversion unit 120 may receive electric power supplied from a power plant and the like to store the electric power in the battery 110, or may convert a characteristic of the electric power (for example, AC/DC, a voltage, and a frequency) so as to discharge the electric power to the electric power system 310. Also, the electric power conversion unit 120 may adjust a characteristic of electric power to be customized to a usage state of the electric power in a case in which the characteristics of the electric power are different from each other upon storing and using.

Electric power being stored in the battery 110 may be a DC form having directional electrodes, and electric power being used at home and an industrial facility may be an AC form. For example, when electric power is supplied from the electric power system 310 to be stored in the battery 110, AC electric power supplied from the electric power system 310 may be converted into DC electric power to be stored in the battery 110. Also, when electric power is supplied to the electric power system 310, the DC electric power stored in the battery 110 may be converted into AC electric power to be supplied to the electric power system 310.

Meanwhile, an electric power generator generating new renewable energy such as solar power, wind power and the like may generate DC electric power. In this case, DC power supplied from a relevant electric power system 310 may be converted into DC electric power storable in the battery 110 to be stored therein.

FIG. 4 is a graph illustrating a magnitude of electric power over time, FIG. 5 is a graph illustrating a frequency of electric power over time, and FIG. 6 is a graph illustrating electric power price over time. Hereinafter, with reference to FIGS. 3 to 6, the control unit 130 will be described in detail.

With reference to FIG. 3, the control unit 130 according to one embodiment of the present disclosure may receive electric power information of the electric power system 310 from the server 320, and also may directly receive the electric power information from the electric power system 310. Further, the control unit 130 may directly receive an input of the electric power information from a user, and also may receive the electric power information from a user terminal. The electric power system 310, the server 320, the control unit 130, and the user terminal may share a single Internet server or a single cloud server with each other. The electric power information may include a reference setting value that is required for an operation of the control unit 130. Here, the reference setting value may include a reference magnitude, a reference frequency, a preset number, preset maximum and minimum values, preset maximum and minimum frequencies, and a preset price, which will be described later, when the control unit 130 controls the battery 110 and the electric power conversion unit 120.

The control unit 130 may control the battery 110 and the electric power conversion unit 120 on the basis of the electric power information. More particularly, the control unit 130 may supply electric power to the electric power system 310 based on the electric power information, and may control the battery 110 and the electric power conversion unit 120 so as to receive electric power supplied from the electric power system 310.

Referring back to FIG. 3, the control unit 130 according to one embodiment of the present disclosure may receive the number of frequencies from the server 320. At this point, the control unit 130 may adjust a frequency of electric power when the number of frequencies of the electric power is greater than a preset number, and may adjust a magnitude of the electric power when the number of frequencies of the electric power is less than a preset number.

Here, the number of frequencies may include the number of frequencies of electric power generated at the electric power system 310. More particularly, the number of frequencies of electric power generated from a plurality of electric power generators may be included, wherein each of the plurality of electric power generators produces electric power of a constant frequency. Also, the number of frequencies of electric power generated from a single electric power generator may be included, wherein the electric power has a frequency that varies with time.

For example, a consumption electric power system 310 such as home generally uses a frequency of 60 Hz so that the number of frequencies of electric power being measured may be one having a frequency of 60 Hz. On the other hand, in an electric power system 310 such as a solar power generator and a wind power generator, a frequency of electric power being measured may vary according to various external factors such as solar radiation, air volume and the like so that electric power being generated may have multiple frequencies.

The control unit 130 may receive the number of frequencies of the electric power being measured from the server 320 in real time. When the number of frequencies of the electric power being measured is greater than a preset number, the control unit 130 may determine that variation of a frequency is large to adjust a frequency of the electric power being measured. Also, when the number of frequencies of the electric power being measured is less than the preset number, the control unit 130 may determine that variation of a frequency is small to adjust a magnitude of the electric power being measured.

For example, a magnitude may be adjusted with respect to electric power consumed at home, an industrial facility and the like, and a frequency may be adjusted with respect to electric power generated from a solar power generator, a wind power generator and the like.

The control unit 130 according to one embodiment of the present disclosure may receive a magnitude of power consumption of the electric power system 310 such as an industrial facility from the server 320. When the received magnitude of power consumption exceeds a preset maximum value, the control unit 130 may control the battery 110 and the electric power conversion unit 120 so as to enable the battery 110 to supply the first electric power to the electric power system 310.

With reference to FIG. 4, the control unit 130 may receive a magnitude of power consumption 410, which is electric power information, from the server 320 in real time. In FIG. 4, the magnitude of power consumption 410 and a magnitude of available power 420 are shown. The magnitude of available power 420 may include preset maximum and minimum values of electric power.

When the magnitude of power consumption 410 exceeds the preset maximum value, the control unit 130 may control the electric power conversion unit 120 to convert the first electric power stored in the battery 110 from DC power to AC power. Thereafter, the control unit 130 may control the battery 110 to supply the first electric power being converted into the AC power to an electric power system 310 that consumes electric power.

Also, as one embodiment, when the magnitude of power consumption 410 is less than the preset minimum value, the control unit 130 may control the battery 110 and the electric power conversion unit 120 to enable the battery 110 to receive and store second electric power from the electric power system 310.

When the magnitude of power consumption 410 is less than the preset minimum value, the control unit 130 may control the electric power conversion unit 120 to convert the second electric power generated at the electric power system 310 such as a power plant and the like from AC power to DC power. Thereafter, the control unit 130 may control the battery 110 to store the second electric power that is converted into DC power. Meanwhile, the preset maximum and minimum values of electric power may be set as necessary by a user.

The control unit 130 according to one embodiment of the present disclosure may receive a frequency of electric power from the server 320. The control unit 130 may control the battery 110 and the electric power conversion unit 120 so as to supply electric power to the electric power system 310, or to receive electric power therefrom.

More particularly, the electric power information may include a frequency of produced electric power of the electric power system 310 such as an electric power generator. When a frequency of the produced electric power exceeds a preset maximum frequency, the control unit 130 may control the battery 110 and the electric power conversion unit 120 to enable the battery 110 to receive and store second electric power from the electric power system 310.

With reference to FIG. 5, the control unit 130 may receive a frequency of produced electric power, which is electric power information of the electric power system 310 such as a power plant, from the server 320 in real time. When the frequency of the produced electric power exceeds a preset maximum frequency, the control unit 130 may control the electric power conversion unit 120 to convert second electric power, which is supplied from the electric power system 310 such as an electric power generator for generating electric power, from AC power to DC power. Thereafter, the control unit 130 may control the battery 110 to store the second electric power that is converted into DC power.

Also, as one embodiment, when a frequency of electric power is less than a preset minimum frequency, the control unit 130 may control the battery 110 and the electric power conversion unit 120 to enable the battery 110 to supply first electric power to the electric power system 310.

With reference to FIG. 5, when a frequency of produced electric power is less than a preset minimum frequency, the electric power conversion unit 120 may be controlled to convert the first electric power stored in the battery 110 from DC power to AC power. Thereafter, the control unit 130 may control the battery 110 to supply the first electric power being converted into DC power to the electric power system 310 which consumes electric power. Meanwhile, the preset maximum and minimum frequencies may be set as necessary by the user.

The control unit 130 according to one embodiment of the present disclosure may set a reference magnitude and a reference frequency, and may calculate a first error ratio that is an error ratio of a magnitude of electric power with respect to the reference magnitude. Also, the control unit 130 may calculate a second error ratio that is an error ratio of a frequency of electric power with respect to the reference frequency. Thereafter, the control unit 130 may adjust the magnitude of the electric power when the first error ratio is greater than the second error ratio, and may adjust the frequency of the electric power when the first error ratio is less than the second error ratio.

For example, when a magnitude and a frequency of power consumption are 100 W and 80 Hz, respectively, and a reference magnitude and a reference frequency are 50 W and 60 Hz, respectively, the first error ratio may be expressed as $$\frac{|50-100|}{50} \times 100 = 100\%.$$

Meanwhile, the second error ratio may be expressed as $$\frac{|60-80|}{60} \times 100 = 33.3\%.$$

At this point, the first error ratio is greater than the second error ratio so that the control unit 130 may adjust a magnitude of electric power with respect to the power consumption.

Otherwise, when a magnitude and a frequency of the power consumption are 60 W and 100 Hz, respectively, and the reference magnitude and the reference frequency are 50 W and 60 Hz the same as those of the above described embodiment, respectively, the first error ratio may be expressed as $$\frac{|80 \times 60|}{80} \times 100 = 20\%.$$

Meanwhile, the second error ratio may be expressed as $$\frac{|60-100|}{60} \times 100 = 66.67\%.$$

At this point, the first error ratio is less than the second error ratio so that the control unit 130 may adjust a frequency of electric power with respect to the power consumption.

Electric power information according to one embodiment of the present disclosure may include electric power price. At this point, when electric power price is less than a preset price, the control unit 130 may control the battery 110 and the electric power conversion unit 120 to enable the battery 110 to receive and store second electric power from the electric power system 310.

With reference to FIG. 6, the control unit 130 may receive electric power price per time slot from the server 320 in real time. When the electric power price is less than a preset price, the control unit 130 may control the electric power conversion unit 120 to convert second electric power, which is supplied from the electric power system 310 such as an electric power generator generating electric power, from AC power to DC power. Thereafter, the control unit 130 may control the battery 110 to store the second electric power being converted into DC power.

More particularly, during a time slot (a) of FIG. 6, electric power price is higher than a preset price so that it may not receive the second electric power being supplied. However, during a time slot (b), the electric power price is lower than the preset price so that it may receive the second electric power supplied from the electric power system 310. Meanwhile, the preset price may be set as necessary by the user.

In accordance with the present disclosure as described above, an electric power magnitude adjustment method and an electric power frequency adjustment method are selectively applied so that there is an effect in which an efficient operation may be possible. Also, in accordance with the present disclosure, electric power is supplied to an electric power system or is supplied therefrom based on electric power information of the electric power system so that there is an effect in which an optimized operation depending on the electric power system may be performed. Further, in accordance with the present disclosure, electric power information of the electric power system is received in real time through a server so that there is an effect in which the electric power information being updated is reflected to an operation in real time.

Although the present disclosure has been described with reference to the embodiments, it should be understood that numerous other substitutions, modifications and alterations can be devised by those skilled in the art without departing the technical spirit of this disclosure, and thus it should be construed that the present disclosure is not limited by the embodiments described above and the accompanying drawings.

What is claimed is:

1. A hybrid power storage apparatus storing electric power, comprising:
   a battery configured to store first electric power supplied to an electric power system and second electric power supplied therefrom;
   an electric power conversion unit configured to convert the first electric power into an alternating current (AC) power and the second electric power into a direct current (DC) power; and
   a control unit configured to receive electric power information of the electric power system from a server, and control charging or discharging of the battery and the electric power conversion unit so as to supply the first electric power to the electric power system or receive the second electric power supplied from the electric power system based on the electric power information,
   wherein the control unit adjusts a frequency of the electric power when the frequency of the electric power varies with time, and adjusts a magnitude of the electric power when the frequency of the electric power is constant.

2. The hybrid power storage apparatus of claim 1, wherein the electric power information includes one or more among a consumption amount of the electric power, a generation amount of the electric power, electric power price, a magnitude of the electric power, a frequency of the electric power, and the number of frequencies of the electric power.

3. The hybrid power storage apparatus of claim 1, wherein the control unit controls charging or discharging of the battery and the electric power conversion unit to supply electric power to the electric power system or receive electric power supplied from the electric power system based on the electric power information.

4. The hybrid power storage apparatus of claim 1, wherein the electric power system includes a transmission unit configured to transmit the electric power information, and one of the server and the control unit receives the electric power information from the transmission unit.

5. The hybrid power storage apparatus of claim 2, wherein the control unit controls charging or discharging of the battery and the electric power conversion unit to enable the battery to supply the first electric power to the electric power system when the magnitude of the electric power exceeds a preset maximum value, and to enable the battery to receive and store the second electric power supplied from the electric power system when the magnitude of the electric power is less than a preset minimum value.

6. The hybrid power storage apparatus of claim 2, wherein the control unit controls charging or discharging of the battery and the electric power conversion unit to enable the battery to receive and store the second electric power supplied from the electric power system when the frequency of the electric power exceeds a preset maximum frequency, and to enable the battery to supply the first electric power to the electric power system when the frequency of the is electric power is less than a preset minimum frequency.

7. The hybrid power storage apparatus of claim 2, wherein the control unit sets a reference magnitude and a reference frequency, calculates a first error ratio that is an error ratio of the magnitude of the electric power with respect to the reference magnitude and a second error ratio that is an error ratio of the frequency of the electric power with respect to the reference frequency, and adjust the magnitude of the electric power when the first error ratio is equal to or greater than the second error ratio and the frequency of the electric power when the first error ratio is less than the second error ratio.

8. The hybrid power storage apparatus of claim 2, wherein the control unit controls charging or discharging of the battery and the electric power conversion unit to enable the battery to receive and store the second electric power supplied from the electric power system when the electric power price is less than a preset price.

9. The hybrid power storage apparatus of claim 1, wherein the control unit receives the electric power information from a user terminal.

* * * * *